United States Patent [19]

Inamoto et al.

[11] 3,870,759

[45] Mar. 11, 1975

[54] 1-ADAMANTYL ALKYL KETONES AND THEIR PREPARATION

[76] Inventors: Yoshiaka Inamoto; Hirokazu Nakayama, both of Wakayama, Japan

[22] Filed: July 13, 1970

[21] Appl. No.: 54,585

[30] Foreign Application Priority Data
July 19, 1969 Japan.............................. 44-57130

[52] U.S. Cl........ 260/586 G, 252/522, 260/617 M, 260/617 C
[51] Int. Cl............................................. C07c 45/00
[58] Field of Search........ 260/586 A, 586 R, 586 M

[56] References Cited
UNITED STATES PATENTS
3,352,912  11/1967  Prichard............................ 260/563

OTHER PUBLICATIONS

Chemical Abstracts, Vol. 63, (1965), p. 516g.

Primary Examiner—Leon Zitver
Assistant Examiner—A. Siegel
Attorney, Agent, or Firm—Woodhams, Blanchard and Flynn

[57] ABSTRACT

The invention is directed to a novel process for preparing 1-adamantyl alkyl ketones with high yields and it provides a novel class of 1-adamantyl alkyl ketones. The process is characterized in that α-alkyl-adamantyl-carbonylacetic ester is hydrolyzed with an alcoholic alkali hydroxide and then decarboxylated.

The 1-adamantyl alkyl ketones are useful in various uses such as perfumes and intermediates for the production of various compounds.

4 Claims, No Drawings

1-ADAMANTYL ALKYL KETONES AND THEIR PREPARATION

This invention relates to a novel process for preparing 1-adamantyl alkyl ketone. More particularly, it relates to a process for preparing 1-adamantyl alkyl ketone represented by the formula (I);

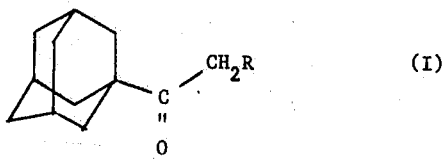

(wherein R is a linear or a branched alkyl group having 1 to 20 carbon atoms) by the process shown by the equations described below. That is, it relates to a novel process for preparing 1-adamantyl alkyl ketone (I) with a high yield by alkylating 1-adamantyl-carbonylacetic ester (II) with a reactive derivative of alkane, RX (wherein R is the same as in the formula (I) and X is a halogen, or a residual group such as sulfuric acid residue or sulfonic acid residue which can give RX an activity as a socalled alkylating agent) and, after hydrolyzing the obtained intermediate (III) with an alcoholic alkali hydroxide, decarboxylating in an acidic aqueous medium.

of ethyl adamantylcarbonylacetate as well as by Hala and Land (*Coll. Czechoslov. Chem. Commun.*, 25, 2692 (1960) ) through reaction of adamantanecarboxylic acid with acetic acid over thorium oxide catalyst at elevated temperature, and adamantyl ethyl ketone, synthesized by Lauria, et al., (*Farmaco, Ed, Sci.*, 22, 681 (1967) ) through reaction of adamantylcarbonyl chloride with diethylcadmium. However, neither of these three methods seem satisfactory for the preparation of the higher homologous members of the ketones. Except for the method of Stetter and Rauscher, which does not have any general applicability to a series of the ketones, the method of Hala and Land would be expected to give only a complex mixture of which the desired adamantyl alkyl ketone could constitute only a minor part, and, according to our experimental findings, the method of Lauria, et al., is applicable with a moderate success only to those alkylcadmiums which have alkyl groups with less than 6 carbon atoms. Otherwise, the yields of alkylcadmiums are so low (usually less than 20 percent) and the reactivity of alkylcadmium towards adamantylcarbonyl chloride is also so poor that the over-all yields of the desired ketones never exceeds 10 percent. It is, accordingly, an object of this invention to provide a novel process for preparing adamantyl alkyl ketones with a yield higher than 90 percent, irrespective of the carbon number of the alkyl group involved.

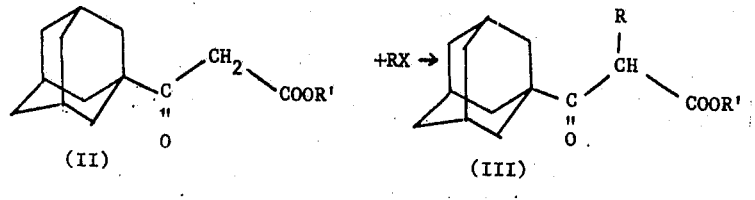

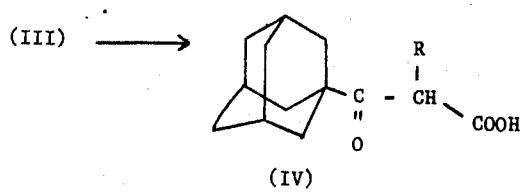

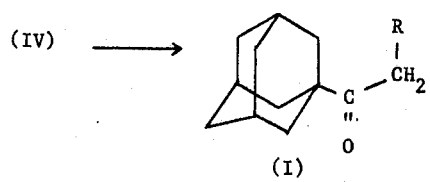

This invention further relates to novel 1-adamantyl aklyl ketones having the above general formula (I) wherein R is a linear or a branched alkyl group having 2 to 20 carbon atoms.

In the homologous series of adamantyl alkyl ketones represented by the general formula I, only the first two members are known so far: adamantyl methyl ketone, synthesized by Stetter and Rauscher (*Chem. Ber.*, 93, 2054 (1960) ) through hydrolysis and decarboxylation It is another object of this invention to provide novel adamantyl alkyl ketones.

Adamantanecarbonylacetic ester (II), one of the starting materials used in the process of the present invention, is produced, for example, according to the process of Stetter, et al., (*Chem. Ber.*, 93, 2054(1960) ) from adamantanecarbonyl chloride and malonic ester with a fairly high yield. Examples of reactive derivatives of alkane used as alkylating agents in the present invention are, illustratively: alkyl halides such as alkyl chloride, alkyl bromide, and alkyl iodide; alkyl sulfates, or alkyl arenesulfonate such as alkyl benzenesulfonate and alkyl p-toluenesulfonate.

The alkylation reaction of 1-adamantylcarbonylacetic ester (II) with RX can be performed in the presence of a base such as alkali metal alcoholate under similar conditions and procedures as used in the usual alkylation of β-keto ester, but the hydrolysis of α-alkyladamantylcarbonylacetic ester (III), the reaction product of the alkylation, to a free β-keto acid (IV) proceeds satisfactorily only under specified conditions, in an alcoholic solution of alkali metal hydroxide. In fact, dilute mineral acids such as sulfuric and hydrochloric acids are most frequently used to prepare ketones from β-keto esters through hydrolysis and decarboxylation (so-called ketonic cleavage) because the latter two reactions can be accomplished in one and the same reaction, and dilute sulfuric acid was the very reagent Stetter and Rauscher used in their preparation of adamantyl methyl ketone from ethyl adamantylcarbonylacetate.

However, it was found, to our surprise, that α-alkyladamantylcarbonylacetic esters with higher alkyl groups could not substantially be hydrolyzed in a refluxing 50 percent aqueous sulfuric acid, even in the presence of some acetic acid. Actually almost all of the starting keto esters were recovered after heating overnight under reflux. In contrast to this, these α-alkyladamantylcarbonylacetic esters are relatively easily hydrolyzed in alkaline media, for instance, alcoholic solution of alkali metal hydroxides, to free β-keto acids. The facts that those keto esters with an adamantyl as well as a higher alkyl group resist acid hydrolysis strongly, but are relatively easily hydrolyzed in an alcoholic alkaline medium are the findings the present inventors discovered for the first time, and these findings relate to an essential part of the present invention.

Alcohols which can be used in the present invention as the solvent for the hydrolysis of the intermediate keto ester (III) may be any lower alkanol such as methyl, ethyl, n-propyl, or i-propyl alcohol. These alcohols may contain some water, the amount of which, however, should not exceed the limit where separation of the dissolved keto ester from the solution if about to begin.

Although any alkali metal hydroxide, for instance, lithium hydroxide, sodium hydroxide, or potassium hydroxide, can be used in the hydrolysis of the keto esters, potassium hydroxide is the most preferable because it gives the highest rate of the reaction. The amount of the alkali metal hydroxide to be used is within the range of 100 to 105 molar percent based on the keto ester to be hydrolysed, and the concentration of the alkali metal hydroxide in the solvent is 1 to 10 percent by weight. The reaction temperature of the hydrolysis is adjusted within the range of room temperature to 50°C. The concentration of the alkali and the reaction temperature are preferably adjusted within the above-stated ranges so as not to cause a side reaction which is known as acid cleavage and leads to fragmentation, rather than hydrolysis, of keto esters.

The product of the hydrolysis reaction in the above process is an alkali metal salt of α-alkyladamantylcarbonylacetic acid, which is then decomposed into carbon dioxide and the desired adamantyl alkyl ketone (I) on reaction with a dilute mineral acid, for example, sulfuric acid or hydrochloric acid. In this reaction step, it may be helpful to distill off under reduced pressure the alcohol used as the solvent before the alkali metal salt of keto acid is caused to react with mineral acid in order for the ketone produced to be isolated easily. Neither complete distilling off of the alcohol nor isolation of the alkali metal salt of keto acid in a pure state is necessary for this purpose. It is sufficient if most of the alcohol is distilled off to give a residue which, although still containing some alcohol, is at once subjected to the decarboxylation reaction.

The amount of mineral acid to be used is in the range 1.0 to 1.1 molar equivalent of the alkali hydroxide used in the preceding reaction. The concentration of the acid is preferably 1 to 50 percent by weight. The decarboxylation reaction is started at room temperature to avoid much frothing resulting from sudden decarboxylation, and is completed by gradually heating to reflux temperature.

Adamantyl alkyl ketones obtained in the process of the present invention can be used as they are, or they are useful as intermediates for the production of various compounds. For instance, ketones with lower alkyl groups such as adamantyl ethyl ketone, adamantyl i-propyl ketone, and adamantyl i-butyl ketone can be used as perfumes or components of perfumeries, as they have a distinct, characteristic odor. Ketones with higher alkyl groups may be reduced to secondary alcohols, which would be starting materials for producing various anionic as well as nonionic surface active agents with potential bacteriostatic activity.

Some examples of this invention are shown below, wherein parts are all by weight, and all melting points and the boiling points are uncorrected.

EXAMPLE 1

Twelve and a half parts of ethyl adamantylcarbonylacetate were added at room temperature to a sodium ethoxide solution prepared from 1.15 parts of sodium metal and 25 parts of anhydrous ethanol, and the mixture was stirred for 15 minutes, when 8.5 parts of methyl iodide were added. After being stirred for 5 hours at room temperature, the reaction was heated under reflux for 1 hour.

Most of the ethanol was removed from the reaction mixture under reduced pressure, the residue being poured into 200 parts of ice water. The organic layer was separated, and the aqueous layer was extracted 3 times each time with 50 parts of benzene. The combined organic layer and benzene extracts was dried over anhydrous sodium sulfate, and the solvent was distilled off on a steam bath, at first at atmospheric pressure and then under reduced pressure.

The residue was dissolved in 50 parts of 95 percent ethanol containing 2.8 parts of potassium hydroxide, and the resulting clear solution was stirred at room temperature for 12 hours.

Most of the solvent was removed from the reaction mixture on a water bath kept below 50°C, the residue being mixed with 30 parts of water. To the mixture was added dropwise 28 parts of 10 percent sulfuric acid with caution, and then the reaction was stirred at room temperature for 10 minutes, followed by heating under reflux for 1 hour.

The organic layer was separated from the cooled reaction mixture, the aqueous layer being extracted with benzene. The combined organic layer and benzene extracts were dried over anhydrous sodium sulfate, and fractionated to give 9.2 parts (92 percent yield) of adamantyl ethyl ketone (I, R=CH$_3$), boiling at 71°C (0.2 mm). The liquid solidified into colorless crystals on standing for a few hours at room temperature. Melting point, 30°–32°C.

| Analysis | | |
|---|---|---|
| Found: | C, 81.1; | H, 10.5% |
| Calculated for C$_{13}$H$_{20}$O: | C, 81.20; | H, 10.48% | ir absorption spectrum (cm$^{-1}$): 1,700; 1,450; 1,350; 1,020 nmr spectrum (τ): 7.58 (q, J=8Hz, 2H)
8.0 (s)  ⎫
8.23 (t, J=3Hz ⎬ (15H)
9.05 (t, J=7Hz, 3H) ⎭

Mass spectrum (m/e): 192 (parent peak), 163 (1-adamantyl carbonyl), 135 (1-adamantyl, base peak).

2,4-Dinitrophenylhydrazone was prepared according to a usual procedure.
Melting point: 168°–169°C.

| Analysis | | | |
|---|---|---|---|
| Found: | C, 61.1; | H, 6.4; | N, 14.3% |
| Calculated for $C_{19}H_{24}N_4O_4$: | C, 61.28; | H, 6.50; | N, 14.05% |

EXAMPLE 2

Twelve and a half parts of ethyl adamantylcarbonylacetate were added at room temperature to a sodium ethoxide solution prepared from 1.15 parts of sodium metal and 25 parts of anhydrous ethanol, and the mixture was stirred for 15 minutes, when 13.3 parts of n-decyl bromide were added. The reaction was heated under reflux for 8 hours.

Most of the ethanol was removed from the reaction mixture under reduced pressure, the residue being poured into 200 parts of ice water. The organic layer was separated, and the aqueous layer was extracted with ether. The combined organic layer and ether extracts were dried over anhydrous sodium sulfate. The ether was distilled off, and the residue was heated to 130°C under a pressure of 0.5 mm to remove any low boiling fractions, which mainly consisted of unreacted ethyl adamantylcarbonylacetate (1.5 parts) and some n-decyl bromide.

The distillation residue was dissolved in 50 parts of 95 percent ethanol containing 2.8 parts of potassium hydroxide, and the resulting clear solution was stirred at room temperature for 12 hours.

Most of the solvent was removed from the reaction mixture on a water bath kept below 50°C, the residue being mixed with 30 parts of water. To the mixture was added dropwise 28 parts of 10 percent sulfuric acid with caution, and then the reaction was stirred at room temperature for 30 minutes, followed by heating under reflux for 1 hour.

The organic layer was separated from the cooled mixture, and the aqueous layer was extracted with ether. The combined organic layer and ether extracts were dried over anhydrous sodium sulfate, and fractionated to give 12.6 parts (90 percent yield) of adamantyl n-undecyl ketone (I, $R=CH_3(CH_2)_9$), boiling at 192°–194°C (0.25 mm).

The liquid solidified on standing at room temperature overnight into colorless crystals with a melting point of 27°C.

| Analysis | | |
|---|---|---|
| Found: | C, 82.8; | H, 11.9% |
| Calculated for $C_{22}H_{38}O$: | C, 82.95; | H, 12.03% | ir spectrum ($cm^{-1}$): 1,700; 1,470 (shoulder); 1,460; 1,370; 1,060; 725

| nmr spectrum ($\tau$): | 7.64 (t, J=6Hz, 2H) |
| | 7.96 (s) ⎫ |
| |         ⎬ (15H) |
| | 8.23 (s) ⎭ |
| | 8.73 (s, 18H) |
| | 9.08 (d, J=2Hz, 3H) |
| Mass spectrum (m/e): | 318 (parent peak), |
| | 183 (dodecanoyl, $C_{11}H_{22}CO$), |
| | 135 (1-adamantyl, base peak). |

2,4-dinitrophenylhydrazone was prepared according to a usual procedure.
Melting point: 93°–94°C.

| Analysis | | | |
|---|---|---|---|
| Found: | C, 67.2; | H, 8.4; | N, 11.1%. |
| Calculated for $C_{28}H_{42}N_4O_4$: | C, 67.44; | H, 8.49; | N, 11.24%. |

EXAMPLE 3

Twelve and a half parts of ethyl adamantylcarbonylacetate were added at room temperature to a sodium ethoxide solution prepared from 1.15 parts of sodium metal and 25 parts of anhydrous ethanol, and the mixture was stirred for 15 minutes, when 20.0 parts of stearyl bromide were added. The reaction was heated under reflux for 8 hours.

Most of the ethanol was removed from the reaction mixture under reduced pressure, the residue being poured into 200 parts of ice water. The organic layer was separated, and the aqueous layer was extracted with ether. The combined organic layer and ether extract was dried over anhydrous sodium sulfate. The ether was distilled off, and the residue was heated to 130°C under a pressure of 0.5 mm to remove any low boiling materials. By this procedure 1.8 parts of unreacted ethyl adamantylcarbonylacetate and some stearyl bromide were recovered.

The distillation residue was dissolved in 50 parts of 95 percent ethanol containing 2.8 parts of potassium hydroxide, and the resulting clear solution was stirred at room temperature for 12 hours.

Most of the solvent was removed from the reaction mixture on a water bath kept below 50°C, the residue being mixed with 30 parts of water. To the mixture was added dropwise 28 parts of 10 percent sulfuric acid with caution, and then the reaction was stirred at room temperature for 30 minutes, followed by heating under reflux for 1 hour.

The organic layer was separated from the cooled mixture, and the aqueous layer was extracted with ether. The combined organic layer and ether extracts were dried over anhydrous sodium sulfate, and fractionated to give 12.5 parts (92 percent yield) of adamantyl n-nonadecyl ketone (I, $R=CH_3(CH_2)_{17}$), boiling at 235°–239°C (0.35 mm).

The distillate solidified into colorless crystals on standing at room temperature overnight.
Melting point, 55.5°–57.5°C.

| Analysis | | |
|---|---|---|
| Found: | C, 82.7; | H, 12.5% |
| Calculated for $C_{30}H_{54}O$: | C, 83.65; | H, 12.64%. | ir spectrum ($cm^{-1}$): 1,700; 1,480 (shoulder); 1,470; 1,390; 1,060; 725

Mass spectrum (m/e): 430 (parent peak), 135 (1-adamantyl, base peak)

2,4-dinitrophenylhydrazone was prepared according to an usual procedure.

Melting point: 85°–86°C

| Analysis | | | |
|---|---|---|---|
| Found: | C, 70.6; | H, 9.5; | N, 9.0%. |
| Calculated for $C_{36}H_{58}N_4O_4$: | C, 70.78; | H, 9.57; | N, 9.17%. |

EXAMPLE 4

Twelve and a half parts of ethyl adamantylcarbonylacetate were added at room temperature to a sodium ethoxide solution prepared from 1.15 parts of sodium metal and 25 parts of anhydrous ethanol, and the mixture was stirred for 15 minutes, when 9.4 parts of ethyl iodide were added. After being stirred for 5 hours at room temperature, the reaction was heated under reflux for 1 hour.

Most of the ethanol was removed from the reaction mixture under reduced pressure, the residue being poured into 200 parts of ice water. Organic layer was separated, and the aqueous layer was extracted three times with each time with 50 parts of ether. The combined organic layer and ether extracts was dried over anhydrous sodium sulfate, and the solvent was distilled off on a steam bath, at first at atmospheric pressure and then under reduced pressure.

The residue was dissolved in 50 parts of 95 percent ethanol containing 2.8 parts of potassium hydroxide, and the resulting clear solution was stirred at room temperature for 12 hours.

Most of the solvent was removed from the reaction mixture on a water bath kept below 50°C, the residue being mixed with 30 parts of water. To the mixture was added dropwise 28 parts of 10 percent sulfuric acid with caution, and then the reaction was stirred at room temperature for 30 minutes, followed by heating under reflux for 2 hours.

The organic layer was separated from the cooled reaction mixture, and the aqueous layer was extracted with ether. The combined organic layer and ether extracts were dried over anhydrous sodium sulfate, and fractionated to give 10.0 parts (94 percent yield) of adamantyl n-propyl ketone (I, $R=C_2H_5$), boiling at 68°–72°C (0.1 mm), $n_D^{25}$ 1.4967.

| Analysis | | |
|---|---|---|
| Found: | C, 81.4; | H, 10.5%. |
| Calculated for $C_{14}H_{22}O$: | C, 81.50; | H, 10.75% | ir spectrum (cm$^{-1}$): 1,700; 1,450; 1,350; 1,075; 1,045; 1,020.

nmr spectrum (τ): 7.62 (t, J=7Hz, 2H),
7.98 (undissolved resonance)
8.20 (undissolved resonance) } (15),
8.45-8.95(complex m, 2H),
9.12 (t, J=7Hz, 3H).

Mass spectrum (m/4): 206 (parent peak),
163 (adamantylcarbonyl),
(adamantyl, base peak),
71 (n-butyroyl).

2,4-Dinitrophenylhydrazone was prepared according to a usual procedure.
Melting point: 157°–158°C.

| Analysis | | | |
|---|---|---|---|
| Found: | C, 61.9; | H, 6.6, | N, 14.5%. |
| Calculated for $C_{20}H_{28}N_4O_4$: | C, 62.16; | H, 6.78; | N, 14.50% |

Other new adamantyl-(1) alkyl ketones according to the present invention as well as their physical properties and analyticals, which have been prepared in substantially the same manner, are shown in the following Table 1.

Table 1

New Adamantyl-(1) Alkyl Ketones

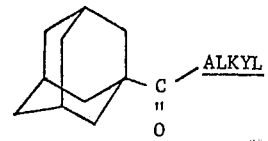

| Alkyl (—CH$_2$—R) | Ketone | | | | | | | 2,4-Dinitrophenylhydrazone | | | | | |
|---|---|---|---|---|---|---|---|---|---|---|---|---|---|
| | bp (°C(mm)) | $n_D$ (Temp.°C) [mp,°C] | Anal. | | | | mp (°C) | Anal. | | | | | |
| | | | C, % Found | C, % Calcd. | H, % Found | H, % Calcd | | C, % Found | C, % Calcd. | H, % Found | H, % Calcd | N, % Found | N, % Calcd |
| CH$_3$(CH$_2$)$_2$ | 68–72 (0.1) | 1.4967 (25)* | 81.4 | 81.50 | 10.5 | 10.75 | 157–168 | 61.9 | 62.16 | 6.6 | 6.78 | 14.5 | 14.50 |
| CH$_3$(CH$_2$)$_3$ | 98–103 (0.1) | 1.4936 (24)* | 81.5 | 81.76 | 11.0 | 10.98 | 175–177 | 62.6 | 62.98 | 6.9 | 7.05 | 13.8 | 13.99 |
| CH$_3$(CH$_2$)$_4$ | 112–114 (0.3) | 1.4925 (24)* | 81.9 | 81.99 | 11.0 | 11.18 | 174–176.5 | 63.5 | 63.75 | 7.1 | 7.30 | 13.2 | 13.52 |
| (CH$_3$)$_2$CH(CH$_2$)$_2$ | 108–118 (0.3) | 1.4948 (24)* | 81.8 | 81.99 | 11.1 | 11.18 | 165–168 | 63.4 | 63.75 | 7.1 | 7.30 | 13.4 | 13.52 |
| CH$_3$(CH$_2$)$_5$ | 126–128 (0.4) | 1.4916 (24)* | 81.9 | 82.20 | 11.2 | 11.36 | 126–128 | 64.3 | 64.46 | 7.3 | 7.53 | 12.9 | 13.08 |
| (CH$_3$)$_2$CH(CH$_2$)$_3$ | 130–133 (0.4) | 1.4916 (23)* | 82.1 | 82.20 | 11.2 | 11.36 | 142–143.5 | 64.3 | 64.46 | 7.4 | 7.53 | 13.0 | 13.08 |
| CH$_3$(CH$_2$)$_6$ | 132–133 (0.3) | 1.4903 (23)* | 82.2 | 82.38 | 11.4 | 11.52 | 122.5–125.5 | 64.9 | 65.13 | 7.5 | 7.74 | 12.6 | 12.66 |
| CH$_3$(CH$_2$)$_8$ | 162–163 (0.3) | 1.4890 (23)* | 82.6 | 82.69 | 11.5 | 11.80 | 106–108 | 66.1 | 66.35 | 8.0 | 8.14 | 11.8 | 11.91 |
| CH$_3$(CH$_2$)$_{10}$ | 192–194 (0.25) | [27] | 82.8 | 82.95 | 11.9 | 12.03 | 93–94 | 67.2 | 67.44 | 8.4 | 8.49 | 11.1 | 11.24 |
| CH$_3$(CH$_2$)$_{12}$ | 197–203 (0.4) | [35.5–37] | 82.9 | 83.17 | 12.2 | 12.22 | 88–89.5 | 68.4 | 68.41 | 8.6 | 8.80 | 10.7 | 10.64 |
| CH$_3$(CH$_2$)$_{14}$ | 215–220 (0.25) | [45.5–46.5] | 83.3 | 83.35 | 12.3 | 12.38 | 84–86 | 69.0 | 69.28 | 8.9 | 9.09 | 9.9 | 10.10 |
| CH$_3$(CH$_2$)$_{16}$ | 228–233 (0.6) | [48–51] | 83.3 | 83.51 | 12.5 | 12.52 | 82–84 | 69.9 | 70.06 | 9.4 | 9.34 | 9.5 | 9.62 |
| CH$_3$(CH$_2$)$_{18}$ | 235–239 (0.35) | [55.5–57.5] | 83.4 | 83.65 | 12.4 | 12.64 | 85–86 | 70.6 | 70.78 | 9.5 | 9.57 | 9.0 | 9.17 |

*The compound is liquid at room temperature.

The embodiments of the invention in which an exclusive property or privilege is claimed are defined as follows:

1. A process for preparing 1-adamantyl alkyl ketone of the formula (I)

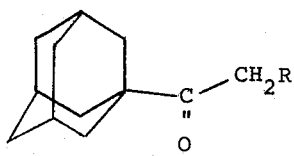 (I)

wherein R is a linear or a branched alkyl group having 1 to 20 carbon atoms, which comprises alkylating ethyl 1-adamantylcarbonylacetate with a compound of the formula RX, wherein R has the same meaning as in formula I and X is halogen, sulfate, $C_6H_5SO_3-$ or $p-CH_3C_6H_4SO_3$, saponifying the resulting α-alkyladamantylcarbonyl acetic ester in an alcoholic alkali metal hydroxide solution and then decarboxylating the free acid thus obtained in an acidic aqueous medium.

2. A process as claimed in claim 1, wherein said alcoholic alkali metal hydroxide solution is a solution of an alkali hydroxide selected from the group of lithium hydroxide, sodium hydroxide and potassium hydroxide in an alcohol selected from the group consisting of methanol and ethanol.

3. A process as claimed in claim 1, in which the alkali metal hydroxide is used in an amount within the range of 100 to 105 molar percent based on the α-alkyladamantylacetic ester, the concentration of the alkali metal hydroxide in the solution is in the range of 1 to 10 percent by weight and the saponification reaction temperature is in the range of from room temperature to 50°C.

4. A process as claimed in claim 3, in which the acidic aqueous medium contains from 1 to 50 percent by weight of mineral acid, the amount of mineral acid used is in the range of 1.0 to 1.1 molar equivalent to the alkali metal hydroxide and the decarboxylation reaction is carried out beginning at room temperature and gradually increasing the temperature to the reflux temperature of the reaction system.

* * * * *

UNITED STATES PATENT OFFICE
CERTIFICATE OF CORRECTION

Patent No. 3,870,759          Dated March 11, 1975

Inventor(s) Yoshiaki Inamoto and Hirokazu Nakayama

It is certified that error appears in the above-identified patent and that said Letters Patent are hereby corrected as shown below:

On the title page, under "Inventors:" change "Yoshiaka" to ---Yoshiaki---.

On the title page, add ---Assignee: Kao Soap Co., Ltd., Tokyo, Japan---.

Col. 9, line 19; change "$p\text{-}CH_3C_6H_4SO_3$," to ---$p\text{-}CH_3C_6H_4SO_3^-$, ---

Signed and sealed this 15th day of July 1975.

(SEAL)
Attest:

RUTH C. MASON
Attesting Officer

C. MARSHALL DANN
Commissioner of Patents
and Trademarks